United States Patent
Oguma et al.

(10) Patent No.: US 9,407,371 B2
(45) Date of Patent: Aug. 2, 2016

(54) OPTICAL MULTIPLEXER/DEMULTIPLEXER

(71) Applicant: NIPPON TELEGRAPH AND TELEPHONE CORPORATION, Tokyo (JP)

(72) Inventors: Manabu Oguma, Atsugi (JP); Ikuo Ogawa, Atsugi (JP); Yoshiyuki Doi, Atsugi (JP); Masayuki Itoh, Atsugi (JP); Hiroshi Takahashi, Atsugi (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 14/424,358

(22) PCT Filed: Sep. 13, 2013

(86) PCT No.: PCT/JP2013/005463
§ 371 (c)(1),
(2) Date: Feb. 26, 2015

(87) PCT Pub. No.: WO2014/041821
PCT Pub. Date: Mar. 20, 2014

(65) Prior Publication Data
US 2015/0229400 A1 Aug. 13, 2015

(30) Foreign Application Priority Data
Sep. 14, 2012 (JP) .................................. 2012-203265

(51) Int. Cl.
*H04B 10/40* (2013.01)
*H04J 14/02* (2006.01)
*G02B 6/12* (2006.01)

(52) U.S. Cl.
CPC *H04B 10/40* (2013.01); *G02B 6/12* (2013.01); *G02B 6/12011* (2013.01); *H04J 14/02* (2013.01)

(58) Field of Classification Search
None
See application file for complete search history.

(56) References Cited

U.S. PATENT DOCUMENTS

| 5,212,758 A | 5/1993 | Adar et al. |
| 5,943,452 A | 8/1999 | Himeno et al. |

(Continued)

FOREIGN PATENT DOCUMENTS

| JP | 2693354 | 2/1994 |
| JP | 3222810 | 4/1998 |

(Continued)

OTHER PUBLICATIONS

IEEE Standard for Information Technology; "Part 3: Carrier Sense Multiple Access with Collision Detections (CSMA/ CD) Access Method and Physical Layer Specification"; IEEE Computer Society; IEEE Std 802.3ba-2010; Jun. 22, 2010.

(Continued)

*Primary Examiner* — Darren E Wolf
(74) *Attorney, Agent, or Firm* — Workman Nydegger

(57) ABSTRACT

A multiplexer/demultiplexer that functions as an extremely small AWG optical filter in order to prepare a miniaturized and low-cost transceiver module necessary to realize a high speed transceiver for Ethernet (registered trademark). An optical multiplexer/demultiplexer includes: at least one input waveguide, a first slab waveguide, an arrayed waveguide group, a second slab waveguide, and at least one output waveguide. Each of the waveguides of the arrayed waveguide group has: a first bent part of which a waveguide extending direction changes 180 degrees or more; and a second bent part of which a waveguide extending direction changes 180 degrees or more in a direction opposite to a direction of the change of the first bent part.

6 Claims, 13 Drawing Sheets

(56) References Cited

U.S. PATENT DOCUMENTS

| | | | |
|---|---|---|---|
| 7,003,195 | B1 | 2/2006 | Huang et al. |
| 2009/0220193 | A1 | 9/2009 | Dragone |
| 2011/0164879 | A1* | 7/2011 | Vasilyev ............ G02B 6/12021 398/81 |

FOREIGN PATENT DOCUMENTS

| | | |
|---|---|---|
| JP | 2002-156614 A | 5/2002 |
| JP | 2003-014960 A | 1/2003 |
| JP | 2003-090925 | 3/2003 |
| JP | 2005-010333 | 1/2005 |
| JP | 4365879 B1 | 11/2009 |
| JP | 2011513779 | 4/2011 |

OTHER PUBLICATIONS

Mochizuki et al., "Built-in Optics for 4ch-WDM ROSA in 100Gbps Ethernet", Mitsubishi Electric Corporation; OECC2010 Technical Digest; Jul. 2010.

CFP Multi-Source Agreement http://www.cfp-msa.org/; accessed Aug. 9, 2012.

Kamei, et al., "Low-Loss and Flat/Wide-Passband CWDM Demultiplexer Using Silica-Based AWG with Multi-Mode Output Waveguide", Optical Society of America; 2003.

Ito et al.;"Small Bend Structures Using Trenches Filled with Low-Refractive Index Material for Miniaturizing Silica Planar Lightwave Circuits;" Journal of Lightwave Technology, vol. 27, No. 6, 786-790; Mar. 15, 2009.

International Search Report in corresponding App. No. PCT/JP2013/005463 dated Nov. 26, 2013.

International Preliminary Report on Patentability and Written Opinion in corresponding Application No. PCT/JP2013/005463 dated Mar. 17, 2015.

Office Action issued on Sep. 8, 2015 in corresponding Japanese Application No. 2014-535386.

Takanori Suzuki et al., *Compact Arrayed-Waveguide Grating with Multiple-Arrowhead Structures*, Japanese Journal of Applied Physics, vol. 45, No. 7, 2006, pp. 5775-5781.

Canadian Office Action dated May 17, 2016, issued in Canadian Application No. 2,884,318.

Extended European Search Report dated May 11, 2016, issued in EP Application No. 13837205.7.

Japanese Office Action dated May 10, 2016, issued in Japanese Application No. 2014-535386.

* cited by examiner

OPTICAL MULTIPLEXER/DEMULTIPLEXER

TECHNICAL FIELD

The present invention relates to an optical multiplexer/demultiplexer that functions as an optical filter for a miniaturized optical transceiver adapted to make optical communication. More specifically, the present invention relates to an optical multiplexer/demultiplexer that is used for an optical communication device necessary for connection in a data center or between data centers.

BACKGROUND ART

With the progress of the Internet, in particular, because of the expectation for progress in cloud computing, an increase in capability of Ethernet-based communication is an urgent challenge. As the next-generation high-speed 40 G/100 G Ethernet (registered trademark) standard, IEEE 802.3ba (NPL 1) was released in 2010, and discussions have been made. In particular, the range of several tens m to several tens km in transmission distance corresponds to a distance necessary for connection in a data center or between data centers, and is focused on because of large potential demand. In this standard, in the range exceeding several tens m, the use of optical communication is recommended because the attenuation of an electric signal is large, and also in consideration of economic efficiency, a multi-lane transmission system capable of avoiding the heavy use of high-speed LSIs (Large Scale Integration) is recommended. In particular, for a transmission distance of several hundreds m or more, a wavelength division multiplexing system using four wavelengths in the wavelength arrangement such as LAN-WDM (Local Area Network Wavelength Division Multiplexing) or CWDM (Coarse Wavelength Division Multiplexing) in the 1.3 μm band is recommended.

Devices responsible for realizing such transmission systems closest to physical media are optical transceivers. In general, an optical transceiver is configured to include: a connector part that inputs/outputs optical and electrical signals; a TOSA (Transmitter Optical Sub-Assembly) and ROSA (Receiver Optical Sub-Assembly) that perform photoelectric conversion; an electronic circuit that controls and monitors respective parts; and an electronic circuit that performs signal conversion as necessary. Further, the ROSA used for such transmission systems is assembled with: an optical filter that demultiplexes a multi-lane signal including four waves in the 1.3 μm band; four PDs (Photo Diodes); a TIA (Trans-Impedance Amplifier) close to the PDs; and the like. For example, there has been reported a ROSA that is prepared using an optical module assembled with four small TFFs (Thin Film Filters) and a total reflection mirror as a 4-ch optical demultiplexing filter (see NPL 2). The ROSA reported in this literature realizes an extremely small module size as a result of using the small TFF chips and advanced packaging technology. However, the optical module prepared using the plurality of TFFs becomes more difficult to manufacture with increasing the number of channels and reducing the size, and a reduction in size and a reduction in cost cannot be easily achieved at the same time.

On the other hand, an arrayed waveguide grating (AWG) optical filter prepared with a silica-based PLC (Planar Lightwave Circuit), which is a multi-channel optical filter, is widely used for telecommunication transmission equipment because of the excellence not only in wavelength demultiplexing characteristics but in mass productivity and reliability. Further, the AWG optical filter is characterized by excellent economic efficiency and mass productivity because in particular, in the case where the number of channels is large or a reduction in size is required, as compares with the optical filter having arranged TFFs, the number of manufacturing steps is small, and the required tolerance of mechanical precision (TFF arrangement precision and waveguide exposure precision) is large.

However, the AWG had a problem once. In the initial stage of AWG development, there was a problem that designing an AWG having a channel spacing of several 10 nm or more caused an increase in chip size. However, such a restriction has been significantly relaxed by devising an arrayed waveguide arrangement, and therefore today, even an AWG having a channel spacing of 100 nm or more can be easily realized (see PTLs 1 and 2).

Regarding an AWG design method, a first conventional example is described first using FIG. 1. FIG. 1 illustrates the outline of a conventional arrayed waveguide grating optical filter. As illustrated in FIG. 1, the arrayed waveguide grating optical filter is configured to include slab waveguides 1 and 2, arrayed waveguide group 3, input waveguide 4, and output waveguides 5. Note that to appropriately operate the arrayed waveguide grating optical filter, it is necessary that connecting points between the waveguide group, which connects the slab waveguides 1 and 2 to each other, and the slab waveguides 1 and 2 are present on extended lines of straight lines radially drawn from focal points of the slab waveguides 1 and 2 on the input and output waveguide sides, and between mutually adjacent ones of all waveguides, the length is different by a certain amount ($d_0$), and monotonically increases or decreases.

In the arrayed waveguide grating filter illustrated in FIG. 1, the arrayed waveguide group 3 is configured by sequentially connecting respective waveguides, i.e., linear waveguides 3a, arcuate waveguides 3c, and linear waveguides 3b, respectively. Note that in the first conventional example, protruding directions of arcs of the arcuate waveguides 3c are only one direction, i.e., in the case of FIG. 1, an upward direction, and therefore relative to lower waveguides of the arrayed waveguide group 3, upper waveguides are longer. However, by appropriately select lengths of the linear waveguides 3a and 3b and radii of the arcuate waveguides 3c, the array waveguide group 3 can be arranged such that between any adjacent ones of all the waveguides, the length is different by the certain amount ($d_0$).

On the other hand, the difference ($d_0$) in length between any adjacent waveguides of the array waveguide group 3 has a relationship given by the following expression (1) with respective parameters ($\lambda_0$: center wavelength, $n_g$: group refractive index, and FSR: free spectral range) of the arrayed waveguide grating optical filter. Note that in the following, $d_0$ is referred to as a waveguide length difference, and $d_0 \times n_e$, which is $d_0$ multiplied by an effective refractive index $n_e$, is referred to as an optical path length difference.

$$\text{Wavelength interval} \times \text{Maximum number of channels} < \lambda_0^2/(d_0 \times n_g) = \text{FSR} \qquad (1)$$

In the case where a required wavelength interval is large, or a large number of channels are required, it is necessary to set the waveguide length difference $d_0$ smaller; however, in the case where the waveguide length difference $d_0$ is extremely small, in the arrayed waveguide group 3, an upper waveguide and a lower waveguide come into contact with or intersect with each other to make it difficult to appropriately operate the arrayed waveguide grating optical filter. That is, according to the first conventional technique described above, from geometrical constraints, a settable waveguide length difference has a lower limit, and therefore the design method according to the first conventional example makes it geometrically impossible to set the optical path length difference extremely short, or even if the setting is possible, may anomalously increase the size of a circuit.

In the case of attempting to realize such a device as a waveguide type, the size of a usable substrate material has a certain limit, and accordingly in the case where the size of a circuit exceeds the certain limit, manufacturing such a device is substantially impossible. Therefore, it is difficult for a wide FSR arrayed waveguide grating requiring setting an optical path length difference extremely short, i.e., an arrayed waveguide grating having a large wavelength interval at which multiplexing/demultiplexing is performed or an arrayed waveguide grating having a number of channels to employ such a configuration.

Next, a second conventional example is described using FIG. 2. Note that PTL 1 discloses an arrayed waveguide grating filter configured as an S-shaped optical waveguide according to the second conventional example. FIG. 2 illustrates the outline of the arrayed waveguide grating optical filter according to the second embodiment. In FIG. 2, the arrayed waveguide grating optical filter is configured to include slab waveguides 1 and 2, arrayed waveguide group 3, and a sectorial arcuate waveguide group 6.

As illustrated in FIG. 2, the slab waveguides 1 and 2 are connected to each other through the S-shaped arrayed waveguide group 3, and an overall circuit configuration is substantially point symmetric. In the S-shaped optical waveguide, left arcuate waveguides 3c and right arcuate waveguides 3d are opposite in arc direction. Accordingly, in the case of directly connecting the arcuate waveguides 3c and corresponding ones of the arcuate waveguides 3d with the arcuate waveguide group 6 being omitted, respective waveguide lengths can be designed to be substantially the same. That is, the S-shaped optical waveguide is configured to once cancel out a waveguide length difference necessary in geometrical arrangement at an inflection point to zero.

In the conventional example illustrated in FIG. 2, an optical path length difference necessary for a filtering operation is given by the sectorial arcuate waveguide group 6 inserted at the inflection point of the S-shaped optical waveguide. The sectorial arcuate waveguide group 6 is configured to include arcuate waveguides among which a center point is the same, a spread angle is the same, a spacing is the same, and a radius increases by a certain amount. The optical path length difference of this circuit is determined by a waveguide length difference between any adjacent ones of the waveguides of the sectorial arcuate waveguide group 6 (a difference in radius×the spread angle), and therefore even in the case of a wide FSR, i.e., even in the case where the optical path length difference is extremely short, a desired circuit can be designed.

On the other hand, the configuration as illustrated in FIG. 2 gives rise to a problem that the waveguide is point symmetrically arranged on the basis of the S-shaped structure, and therefore the length L of the circuit is large. As a result, there is a problem that the size of the circuit exceeds the size of an effective substrate, or even in the case where the circuit can be arranged on the substrate, the number of circuits arrangeable on one substrate is small.

Next, a third conventional example is described using FIG. 3. FIG. 3 illustrates the outline of an arrayed waveguide grating optical filter according to the third conventional example. The third conventional example is the arrayed waveguide grating filter that is configured as a substantially line-symmetric waveguide group (see Patent Literature 2). As illustrated in FIG. 3, the arrayed waveguide grating optical filter includes slab waveguides 1 and 2, arrayed waveguide group 3, input waveguide 4, output waveguides 5, and sectorial arcuate waveguide group 6. In particular, the left side part of the arrayed waveguide group 3 is configured as an arrayed waveguide group 3g configured by sequentially connecting respective waveguides, i.e., linear waveguides 3a, corresponding ones of arcuate waveguides 3c, and corresponding ones of linear waveguides 3e, and the right side part of the arrayed waveguide group 3 is configured as an arrayed waveguide group 3h configured by sequentially connecting respective waveguides, i.e., linear waveguides 3f, corresponding ones of arcuate waveguides 3d, and corresponding ones of linear waveguides 3b.

In the arrayed waveguide group 3g and arrayed waveguide group 3h, a difference in length between upper and lower ones of adjacent waveguides can be designed to be constant by, in the same manner as the design method in the first conventional example described using FIG. 1, appropriately selecting the length of each of the linear waveguides and the radius of each of the arcuate waveguides. However, protruding directions of arcs of the arcuate waveguides 3c and arcuate waveguides 3d are all upward, and therefore relative to a lower waveguide, an upper waveguide is inevitably long. That is, only the arrayed waveguide group 3g and arrayed waveguide group 3h of which the protruding directions of the arcs are the same cannot make a waveguide length difference zero.

However, in FIG. 3, protruding directions of arcs of sectorial arcuate waveguides 6 are opposite directions to those of the arcuate waveguides 3c and arcuate waveguides 3d, and therefore by appropriately selecting a spread angle and an arcuate radius of the sectorial waveguide group 6 configured to include arcuate waveguides among which a center point is the same, a spread angle is the same, a spacing is constant, and a radius increases by a certain amount, the waveguide length difference can be configured to be once cancelled out to zero. After that, by increasing or decreasing the spread angle of the sectorial waveguides by a necessary amount, the waveguide length difference of the arrayed waveguide group 3 can be easily set to a value required by a wide FSR AWG. In the case of designing an AWG by the design method according to the third example described using FIG. 3, as compared with the design method according to the second conventional example described using FIG. 2, the degree of freedom of combination of arcuate waveguides is different, and therefore an AWG having a smaller circuit size may be designable.

CITATION LIST

Patent Literature

PTL 1: Japanese Patent No. 2693354
PTL 2: Japanese Patent No. 3222810

Non Patent Literature

NPL 1: IEEE Std 802.3ba-2010 http://www.ieee802.org/3/ba/
2: K. Mochizuki, et al., "Built-in Optics for 4ch-WDM ROSA in 100 Gbps Ethernet", OECC 2010
NPL 3: CFP Multi-Source Agreement http://www.cfp-msa.org/
NPL 4: S. Kamei, et al., "Low-loss and flat/wide-passband CWDM demultiplexer using silica-based AWG with multi-mode output waveguide", TuI2 OFC 2004

SUMMARY OF INVENTION

Technical Problem

However, in addition to the IEEE recommendation, the industry standard called MSA (Multi Source Agreement) regulates the size, pin arrangement, and the like for optical transceivers, and for optical transceivers for 40 G/100 G Ethernet, miniaturization and power saving are strongly required (NPL 3). In particular, the outer size of modules discussed as CFP4 is approximately 9.5×21.7×88 mm, which is extremely small (CFP: an abbreviation of Form-factor Pluggable. "C" represents one hundred (100) in Roman numerals.). In addition, inside a module of this size, a ROSA and a TOSA, and an electronic circuit and the like necessary for the transceiver should be arranged in parallel and in series, respectively, and therefore a space allowed for a single body of ROSA, and in addition a space allowed for an optical filter incorporated in the ROSA are extremely small.

Designing an AWG that performs multiplexing/demultiplexing in a wavelength range corresponding to a large channel spacing such as in LAN-WDM or CWDM recommended by IEEE has become possible by the use of a sectorial arcuate waveguide group; however, there is a challenge that a preparable AWG is elongated in circuit form, and to contain the AWG in a module such as CFP4, the circuit form should be shortened to further reduce the AWG itself.

The circuit size of the AWG main body can be reduced to some extent by increasing a refractive index difference ($\Delta$) of the waveguide and decreasing a minimum bending radius; however, the size of an output fan-out part adapted to be coupled to individual PDs is also strongly dependent on a PD interval (or a terminal interval of TIAs connected to the PDs), and therefore there is a problem that sufficient miniaturization cannot be performed only by increasing $\Delta$.

Further, specifications recommended by IEEE include not only the optical wavelength channel spacing but also a wavelength bandwidth of each channel. For this reason, it is necessary to ensure a transmission wavelength bandwidth for an optical filter. It is reported that configuring an output waveguide as a multimode waveguide expands the transmission wavelength bandwidth (NPT 4); however, as compared with a singlemode waveguide, a multimode waveguide is large in minimum bending radius. For this reason, the AWG by any of the design methods according to the conventional examples has a problem that the size of an output fan-out part (spread-out part) takes a large space in layout.

On the other hand, optical transceivers for Ethernet are supposed to be often used for connection in a data center and between data centers, and therefore compete with inexpensive electrical signal transceivers, so that the optical transceivers for Ethernet require a considerable reduction in cost as compared with optical transceivers for telecommunications.

An optical filter used for a ROSA should be, on the input side, optically coupled to a connector of an optical cable through an optical component called a receptacle, and on the output side, optically connected to four PDs through optical lenses. When assembling the ROSA, these components should be precisely aligned and fixed so as to prevent mutual misalignment.

The simplest method as an alignment method is one that makes light having an actually used signal light wavelength enter from the above-described optical cable, and pass sequentially through the optical filter, optical lenses, and PDs, and then while monitoring electrical outputs from the PDs, collectively performs multi-body alignment of all the components. However, this method requires a very complicated multi-body aligner, and therefore has a problem of extremely high cost.

Also, for a PD, optical filter, and optical fiber, different types of materials having very different refractive indices must be inevitably selected, and accordingly reflection at boundaries between the materials occurs. Further, in the case of using a lens system in order to increase coupling efficiency of each optical coupling, an air layer is added for each lens surface, and consequently reflection occurs many more times. To improve received S/N, typically, an antireflective film is provided for a telecommunication purpose; however, for an Ethernet purpose, a there is a challenge of avoiding an increase in cost along with the increase in processing step.

The present invention is made in consideration of the above-described conventional problems, and intends to provide a multiplexer/demultiplexer that can constitute a miniaturized, low-cost ROSA module necessary to realize high-speed Ethernet transceivers, and functions as an extremely small AWG optical filter. Further, another object is to suppress an increase in manufacturing cost of the ROSA module caused by a circuit added to the AWG optical filer, and the shape of a chip.

Solution to Problem

In order to solve the above problems, an invention described in an embodiment is an optical multiplexer/demultiplexer including: at least one input waveguide that has an input part at one end; a first slab waveguide of which one end is connected to the other end of the input waveguide; an arrayed waveguide group of which one end is connected to the other end of the first slab waveguide, the arrayed waveguide group having multiple waveguides; a second slab waveguide of which one end is connected to the other end of the arrayed waveguide group; and at least one output waveguide of which one ends are connected to the other end of the second slab waveguide and the other ends respectively have output parts, wherein each of the waveguides of the arrayed waveguide group has: a first bent part of which a waveguide extending direction changes 180 degrees or more; and a second bent part of which a waveguide extending direction changes 180 degrees or more in a direction opposite to a direction of the change of the first bent part.

DESCRIPTION OF EMBODIMENTS

Figure 1:
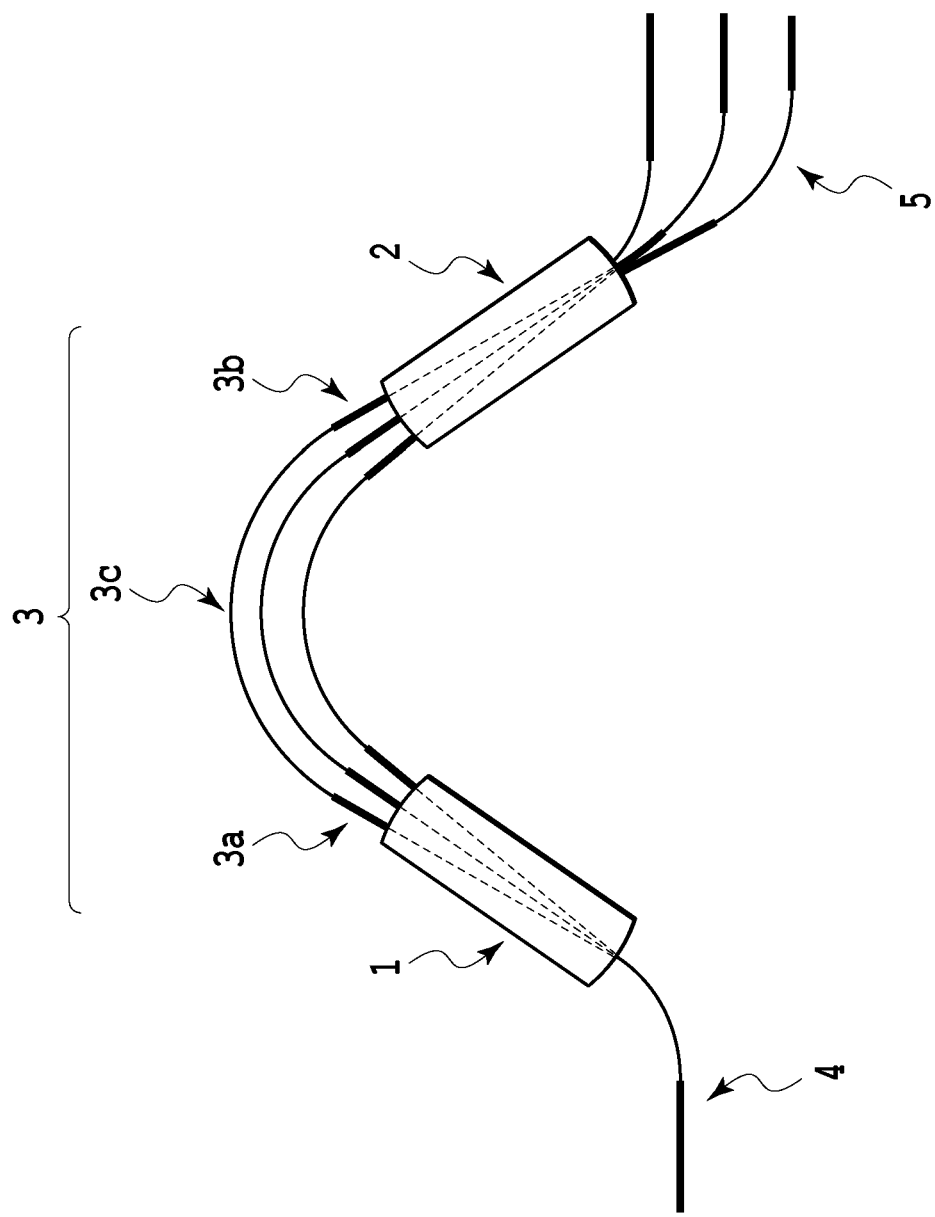
FIG. 1 is a schematic diagram of an arrayed waveguide grating optical filter according to a first conventional example.
Figure 2:
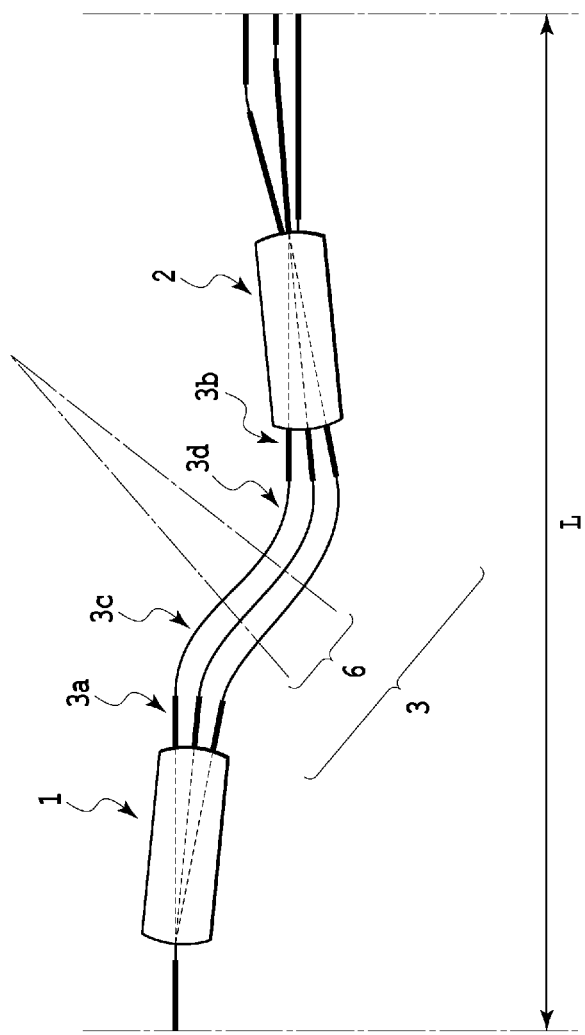
FIG. 2 is a schematic diagram of an arrayed waveguide grating optical filter according to a second conventional example.
Figure 3:
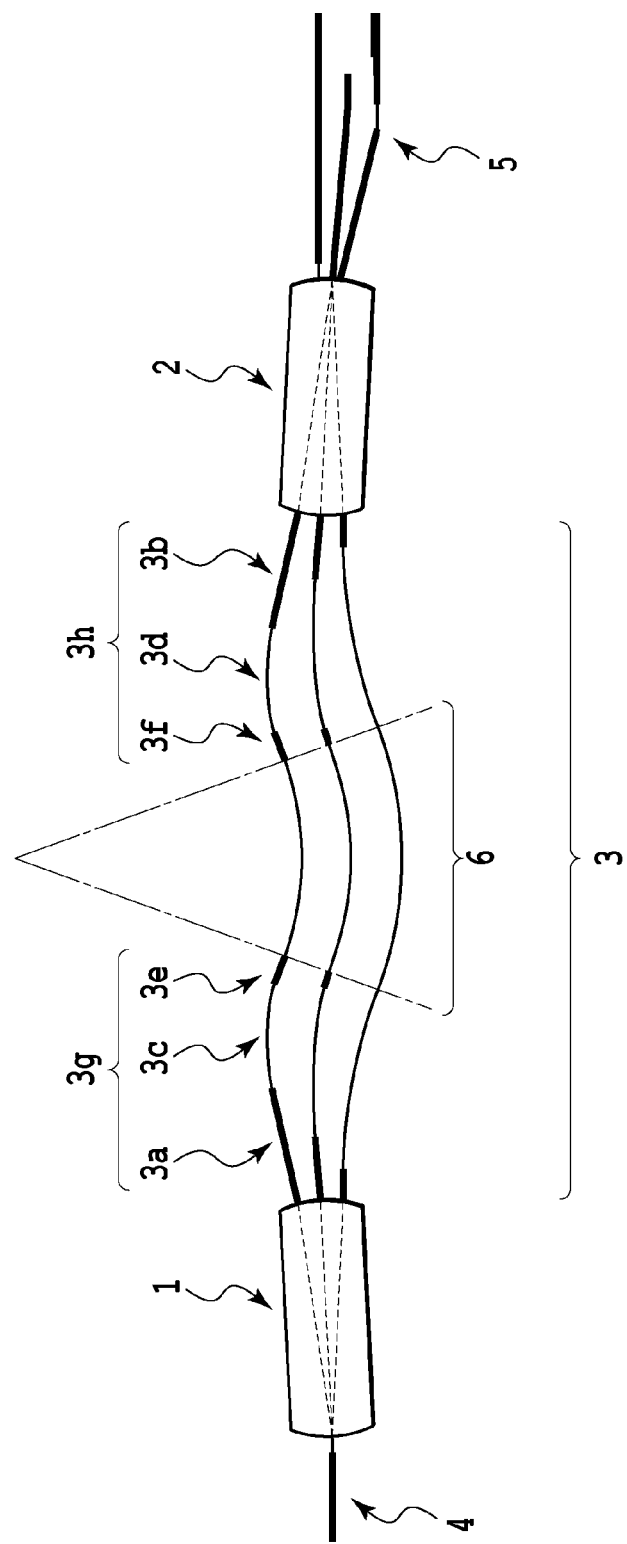
FIG. 3 is a schematic diagram of an arrayed waveguide grating optical filter according to a third conventional example.

Embodiments of the present invention will hereinafter be described in detail.

An optical multiplexer/demultiplexer of the present invention is an arrayed waveguide grating optical multiplexer/demultiplexer including: at least one input waveguide; a first slab waveguide that is connected to the input waveguide; an arrayed waveguide group that is connected to the first slab waveguide and includes a plurality of parallel-arranged waveguides; a second slab waveguide that is connected to the arrayed waveguide group; and at least one output waveguide that are connected to the second slab waveguide, and configured such that the respective waveguides of the arrayed waveguide group connected to the first slab change extending directions of the respective waveguides 180 degrees or more, then change the extending directions of the waveguides 180 degrees or more in an opposite direction, and are then connected to the second slab. Here, it can be said that the "extending directions of the waveguides" are the same as optical axis directions of lights guided in the waveguides, respectively. Also, it can be said that the arrayed waveguide group has the following configurations (1) to (3).

(1) Each of the waveguides of the arrayed waveguide group includes a first part and a second part, in which the first part is from an exit end of the input slab waveguide (first slab waveguide) to a connecting point of the second part, of which an optical path bends 180 degrees or more from the exit end in a first direction, and the second part is from a connecting point of the first part to an entrance end of the output slab waveguide (second slab waveguide), of which an optical path bends 180 degrees or more from the connecting point in a second direction opposite to the first direction. Note that in this description, a "bent" optical path refers to an optical path of which the entire part may not necessarily be bent, and also includes a configuration having a part where a curvature of the optical path is zero.

(2) Each of the waveguides of the arrayed waveguide group includes a first part and a second part, in which the first part is from the exit end of the input slab waveguide to the connecting point of the second part, and includes an arcuate waveguide bent 180 degrees or more in the first direction, and the second part is from the connecting point of the first part to the entrance end of the output slab waveguide, and includes an arcuate waveguide bent 180 degrees or more in the second direction opposite to the first direction. Note that in this description, an "arcuate waveguide" refers to a wave guide of which the entire part may not necessarily be bent, and also includes a configuration having a part where a curvature of the waveguide is zero.

(3) Each of the waveguides of the arrayed waveguide group includes a first arcuate waveguide and a second arcuate waveguide, in which the first arcuate waveguide is bent 180 degrees or more in the first direction from the exit end of the input slab waveguide and is connected to the second arcuate waveguide, and the second arcuate waveguide is bent 180 degrees or more in the second direction opposite to the first direction from a connecting point of the first arcuate waveguide, and is connected to the entrance end of the output slab waveguide.

Each of the arrayed waveguides connected to the first slab waveguide once changes an extending direction thereof 180 degrees or more, further change the extending direction 180 degrees or more in an opposite direction, and is then connected to the second slab. With this configuration, even a wide FSR AWG can be decreased in area of a main body thereof without being formed in an elongated shape.

Preferably, a connecting point between the input waveguide and the first slab waveguide and a connecting point between the second slab waveguide and the output waveguides are arranged on the inside between the rightmost end and leftmost end of an area where the arrayed waveguide group including the plurality of parallel-arranged waveguides is arranged, and the connecting point between the input waveguide and the first slab waveguide and the connecting point between the second slab waveguide and the output waveguides are arranged on the inside between the uppermost end and lowermost end of the area where the arrayed waveguide group including the plurality of parallel-arranged waveguides is arranged.

By arranging the two slab waveguides not at both ends but on the inner side in layout, input and output fan-out parts of the AWG can be efficiently arranged, and a footprint of the AWG including the output fan-out part can be decreased.

Also, preferably, there is an aligning input waveguide reaching a third side that is different from a first side of optical multiplexer/demultiplexer reached by the input waveguide, and different from a second side reached by at least one of the output waveguides; the aligning input waveguide is connected to the first slab waveguide; and one ends of two of the plurality of output waveguides, which are not connected to the second slab waveguide, are mutually connected to thereby form the two output waveguides into a loop shape.

One end of the aligning input waveguide is connected to the one slab waveguide, and the looped waveguide is connected to the other slab waveguide. This configuration makes it possible to make aligning lights exit from both of input and output waveguides of the AWG by selecting wavelengths of the lights inputting to the aligning input waveguide.

Further, preferably, of the input waveguide, output waveguides, and aligning input waveguide, at least one waveguide reach at least one chip side while having a tilt of eight degrees or more from a normal direction to the chip sides.

Only by dicing the chip along a side reached by each of the input and output waveguides or aligning input waveguide, a return loss can be suppressed without performing oblique polishing or an antireflection film coating step. As a result, a polishing step can be omitted, and correspondingly a cost can be reduced.

FIRST EXAMPLE

Figure 4:
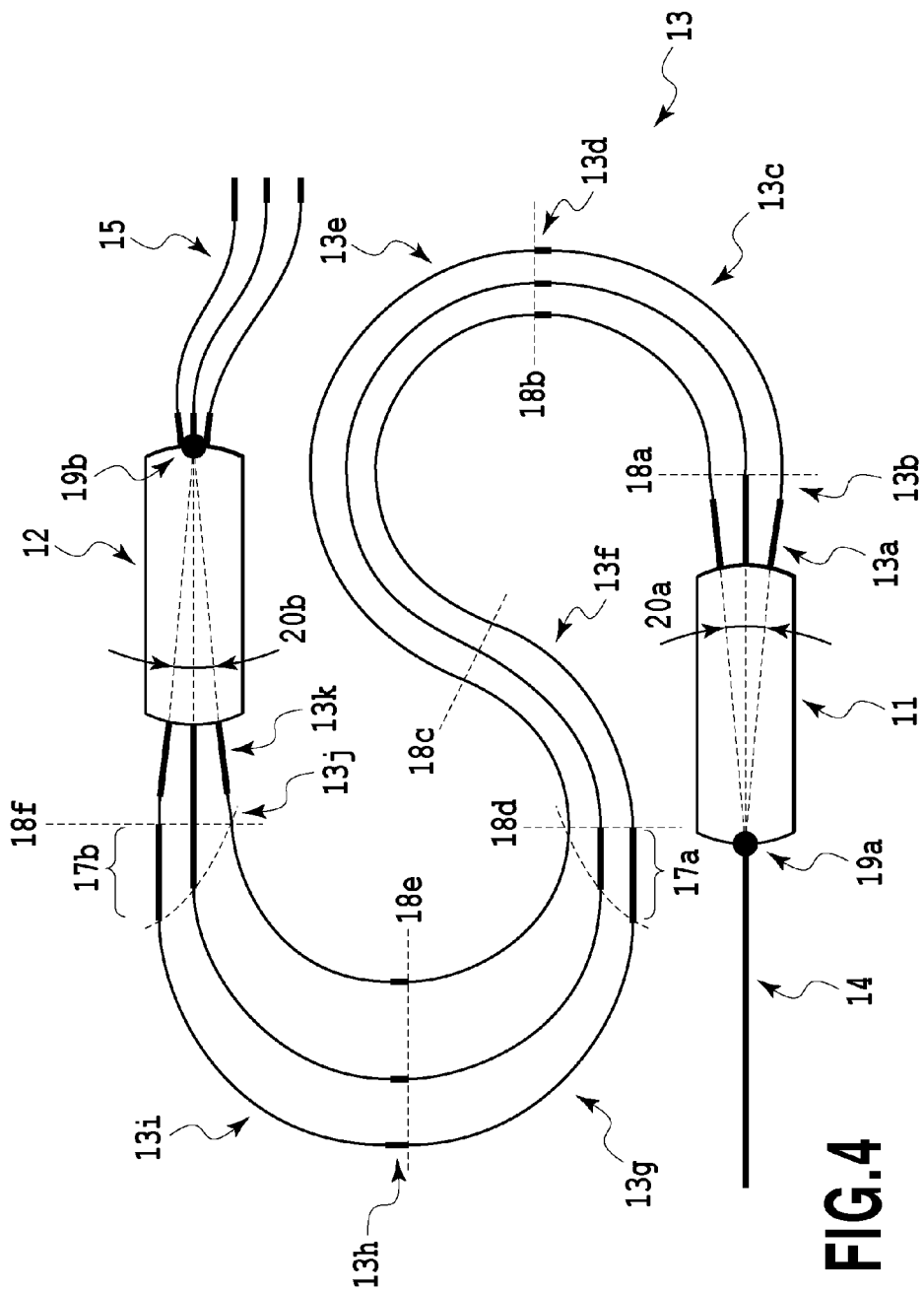
FIG. 4 is a schematic diagram of an arrayed waveguide grating optical filter according to a first example.

FIG. 4 illustrates the outline of an arrayed waveguide grating optical filter according to this example. As illustrated in FIG. 4, the arrayed waveguide grating optical filter according to this example includes a first slab waveguide 11, second slab waveguide 12, arrayed waveguide group 13, input waveguide 14, and output waveguides 15.

The arrayed waveguide group 13 is an arrayed waveguide group including S-shaped waveguides respectively configured by connecting linear waveguide 13a, arcuate waveguides 13b, arcuate waveguides 13c, linear waveguides 13d, arcuate waveguides 13e, arcuate waveguides 13f, first waveguide length difference adjusting linear waveguides 17a, arcuate waveguides 13g, linear waveguides 13h, arcuate waveguides 13i, second waveguide length difference adjusting linear waveguides 17b, arcuate waveguides 13j, and linear waveguides 13k in series, and the total length of each of the S-shaped waveguides monotonously increases or decreases by a constant value between any adjacent ones of the waveguides.

Note that the length of each of the waveguides, i.e., from the linear waveguides 13a to the linear waveguides 13k, and the length of each of the waveguides, i.e., the first waveguide length difference adjusting linear waveguides 17a and the second waveguide length difference adjusting waveguides 17b may be respectively zero.

The respective S-shaped waveguides constituting the arrayed waveguide group 13 orthogonally intersect with a first reference line 18a via the linear waveguides 13a and arcuate waveguides 13b from the first slab waveguide 11, orthogonally intersect with a second reference line 18b via the arcuate waveguides 13c and linear waveguides 13d, orthogonally intersect with a third reference line 18c via the arcuate waveguides 13e, orthogonally intersect with a fourth reference line 18d via the arcuate waveguides 13f, orthogonally intersect with a fifth reference line 18e via the first waveguide length difference adjusting linear waveguides 17a and arcuate waveguides 13g, orthogonally intersect with the sixth reference line 18f via the linear waveguides 13h, arcuate waveguides 13i, and second waveguide length difference adjusting linear waveguides 17b, and is coupled to the second slab waveguide 12 via the arcuate waveguides 13j and linear waveguides 13k.

Among the respective S-shaped waveguides constituting the arrayed waveguide group 13, when setting a propagation direction of optical signals to a direction from the first slab waveguide 11 toward the second slab waveguide 12, the arcuate waveguides 13c and the arcuate waveguides 13e are concaved leftward with respect to the propagation direction, and the arcuate waveguides 13f, arcuate waveguides 13g, and arcuate waveguide 13i are concaved rightward with respect to the propagation direction. The total of spread angles of the arcuate waveguides 13c and arcuate waveguides 132 are designed to have the same value as the total of spread angles of the arcuate waveguides 13f, arcuate waveguides 13g, and arcuate waveguides 13i. For this reason, except for the first waveguide length difference adjusting linear waveguides 17a and the second waveguide length difference adjusting linear waveguides 17b, the lengths of the respective S-shaped waveguides are substantially the same.

Strictly, the sum of the lengths of each of the linear waveguides 13a and a corresponding one of the arcuate waveguides 13b after the first slab waveguide 11 and before orthogonally intersecting with the first reference line 18a and the lengths of corresponding ones of the arcuate waveguides 13j and linear waveguides 13k after orthogonally intersecting the sixth reference line 18f and before being coupled to the second slab waveguide 12 is different for each of the S-shaped waveguides. In addition, the lengths of each of the linear waveguides 13d and a corresponding one of the linear waveguides 13h are also different for each of the S-shaped waveguides. The differences in length are caused by the fact that extended lines of the linear waveguides 13a intersect with one another at a first reference point 19a, and extended lines of the linear waveguides 13k intersect with each other at a second reference point 19b. A spread angle 20a of the linear waveguides 13a around the first reference point 19a, and a spread angle 20b of the linear waveguides 13k around the second reference point 19b give substantially the same values as numerical apertures of the input waveguide 14 and the output waveguides 15 through design. As a result, a difference in total length between any adjacent ones of the S-shaped waveguides falls below approximately a few μm. However, the difference in total length between any adjacent ones of the S-shaped waveguides has a finite value, but the difference in the total length each of the S-shaped waveguides can be designed to be strictly zero by adjusting the lengths of the first waveguide length difference adjusting linear waveguides 17a and the lengths of the second waveguide length difference adjusting linear waveguides 17b.

The arrayed waveguide group 13 has a first bend part formed of the waveguides from the first reference line 18a to the third reference line 18c, and a second bent part formed of the waveguides from the third reference line 18c to the sixth reference line 18f. The first bent part is a part where the waveguides constituting the arrayed waveguide group 13 is bent 180 degrees or more. The second bend part is a part where the waveguides constituting the arrayed waveguide group 13 is bent 180 degrees or more in a direction opposite to a bending direction of the first bent part. Accordingly, the optical axis directions of the lights guided in the arrayed waveguide group 13 change by 180 degrees or more from the first reference line 18a to the third reference line 18c, and change by 180 degrees or more in the direction opposite to the bending direction of the first bent part from the third reference line 18c to the sixth reference line 18f.

To operate the arrayed waveguide grating optical filter illustrated in FIG. 4 as a wavelength multiplexer/demultiplexer filter, it is only necessary to first calculate a waveguide length difference $d_0$ from a desired FSR using the above-described expression (1) (the numerical expression is given below again), and design the lengths of the first waveguide length difference adjusting linear waveguides 17a and the lengths of the second waveguide length difference adjusting linear waveguides 17b so as to make the waveguide length difference $d_0$ equal to the difference in total length between any adjacent ones of the S-shaped waveguides.

$$\text{Wavelength interval} \times \text{Maximum number of channels} < \lambda_0^2/(d_0 \times n_g) = \text{FSR} \quad (1)$$

In the above expression (1), $\lambda_0$: center wavelength, $n_g$: group refractive index, and FSR: free spectral range.

Figure 5:
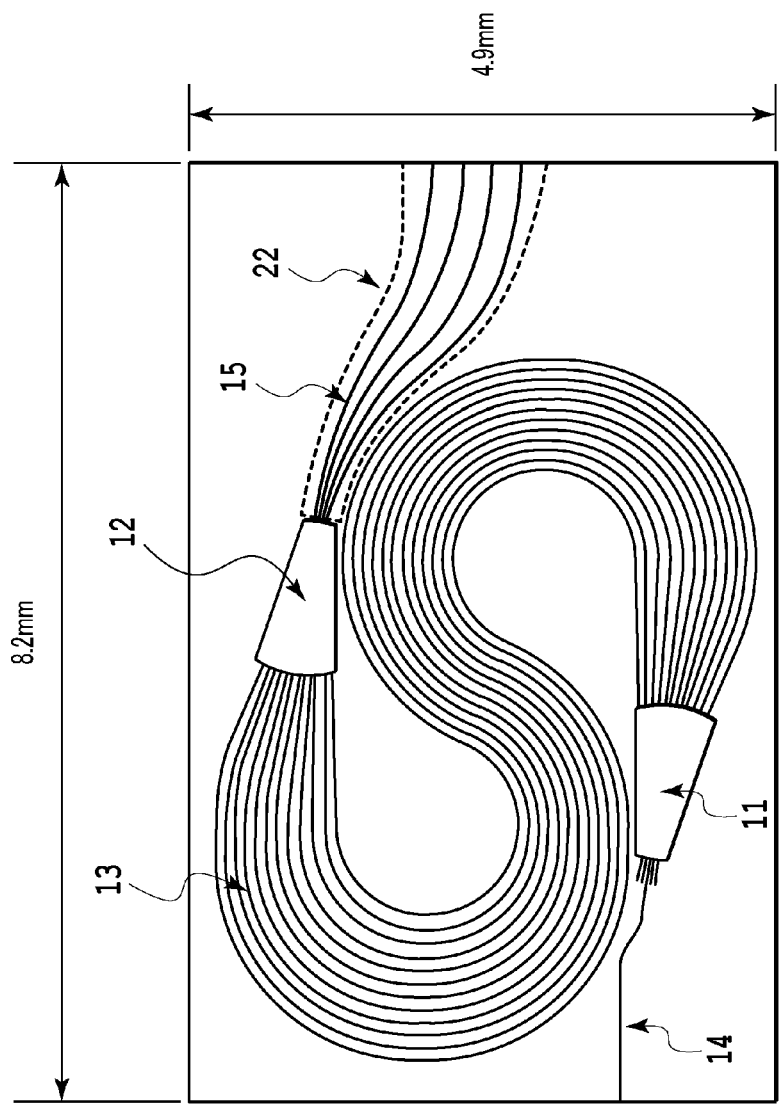
FIG. 5 is a waveguide arrangement diagram of an arrayed waveguide grating optical filter for CWDM signal four-channel demultiplexing designed in the first example.

FIG. 5 is a waveguide arrangement diagram of an arrayed waveguide grating optical filter for CWDM signal 4-channel demultiplexing actually designed by the above-described design method. A waveguide used was an embedded waveguide using silica glass doped with germanium, in which a refractive index difference was adjusted to 2%, and the core height and core width of a reference waveguide were respectively adjusted to 4 μm and 4 μm. In this reference waveguide, a minimum bending radius in the 1300-nm band was 750 μm as described above. Wavelengths of demultiplexed optical signals were set to 1271 nm, 1291 nm, 1311 nm, and 1331 nm, and in order to reduce a difference in transmission loss between channels, the FSR was set to 3250 GHz. As a result, the waveguide length difference provided between any adjacent S-shaped arrayed waveguides was set to 6.498 μm.

In addition, to exhibit flatness in a transmission range in multiplexing/demultiplexing characteristics, waveguide widths of the input waveguide 14 and output waveguides 15 were set to different values, respectively. Specifically, the width of the input waveguide 14 connected to the first slab waveguide 11 was set to 8.0 μm, and the width of the four output waveguides 15 connected to the second slab waveguide 12 were set to 15 μm. In addition, since higher-order mode lights were also propagated through the output waveguides 15 having a width of 15 μm, a minimum bending radius was set to 1200 μm. Also, a spacing between adjacent light receiving surfaces of an array of four successive PDs prepared was 250 μm, and therefore a spacing between adjacent output waveguides was set to 250 μm. It was expected that the minimum bending radius and the output waveguide spacing increased a fan-out part 22 of the output waveguides, and therefore the connecting point between the second slab waveguide 12 and the output waveguides 15 was arranged on the inside between the rightmost end and leftmost end of an area where the arrayed waveguide group 13 was arranged and on the inside between the uppermost end and the lowermost end of an area where the arrayed waveguide group 13 was arranged. That is, the connecting point between the second slab waveguide 12 and the output waveguides 15 is arranged so as to make a distance from a side of a chip where the waveguides are formed (in FIG. 5, indicated by a rectangular frame surrounding the waveguides) to the second slab waveguide 12 larger than a distance from the side of the chip to the arrayed waveguide group 13.

Also, as illustrated in FIG. 5, the connecting point between the first slab waveguide 11 and the input waveguide 14 was arranged on the inside between the rightmost end and leftmost end of the area where the arrayed waveguide group 13 was arranged and on the inside between the uppermost end and the lowermost end of an area where the arrayed waveguide group 13 was arranged. That is, the connecting point between the first slab waveguide 11 and the input waveguide 14 is arranged so as to make a distance from a side of the chip where the waveguides are formed to the slab waveguide 11 larger than a distance from the side of the chip to the arrayed waveguide group 13. Note that the specific arrangement of the arrayed waveguide group 13 was designed according to the design method described using FIG. 4.

Further, in order to suppress reflection at the chip ends of the output waveguides, the output waveguides were designed so as to reach the side of the chip on the output side while having a tile of 8 degrees from a normal direction to the side of the chip. In addition, the input waveguide may also be designed so as to reach the side of the chip on the input side while having a tilt of 8 degrees with respect to the side of the chip.

As described, as a result of specifically designing the layout of the arrayed waveguide grating optical multiplexer/demultiplexer according to the design method of the present invention, as illustrated in FIG. 5, the AWG was able to be arranged within a small footprint, i.e., a chip size of 8.2 mm long by 4.9 mm wide.

Further, the connecting point between the second slab waveguide 12 and the output waveguides 15 was arranged on the inside between the rightmost end and leftmost end of the area where the arrayed waveguide group 13 was arranged and on the inside between the uppermost end and the lower most end of an area where the arrayed waveguide group 13 was arranged, and therefore positions of the output waveguides 15 at the chip end were able to be arranged in the center of the chip as a secondary effect. By being able to arrange the positions of the output waveguides 15 at the chip end in the center of the chip, the need for a wasted space extending in the vertical direction when assembling PDs, TIAs, and lead-out electrodes is eliminated, and therefore there is the advantage of being able to eventually decrease a ROSA module size.

Figure 6:
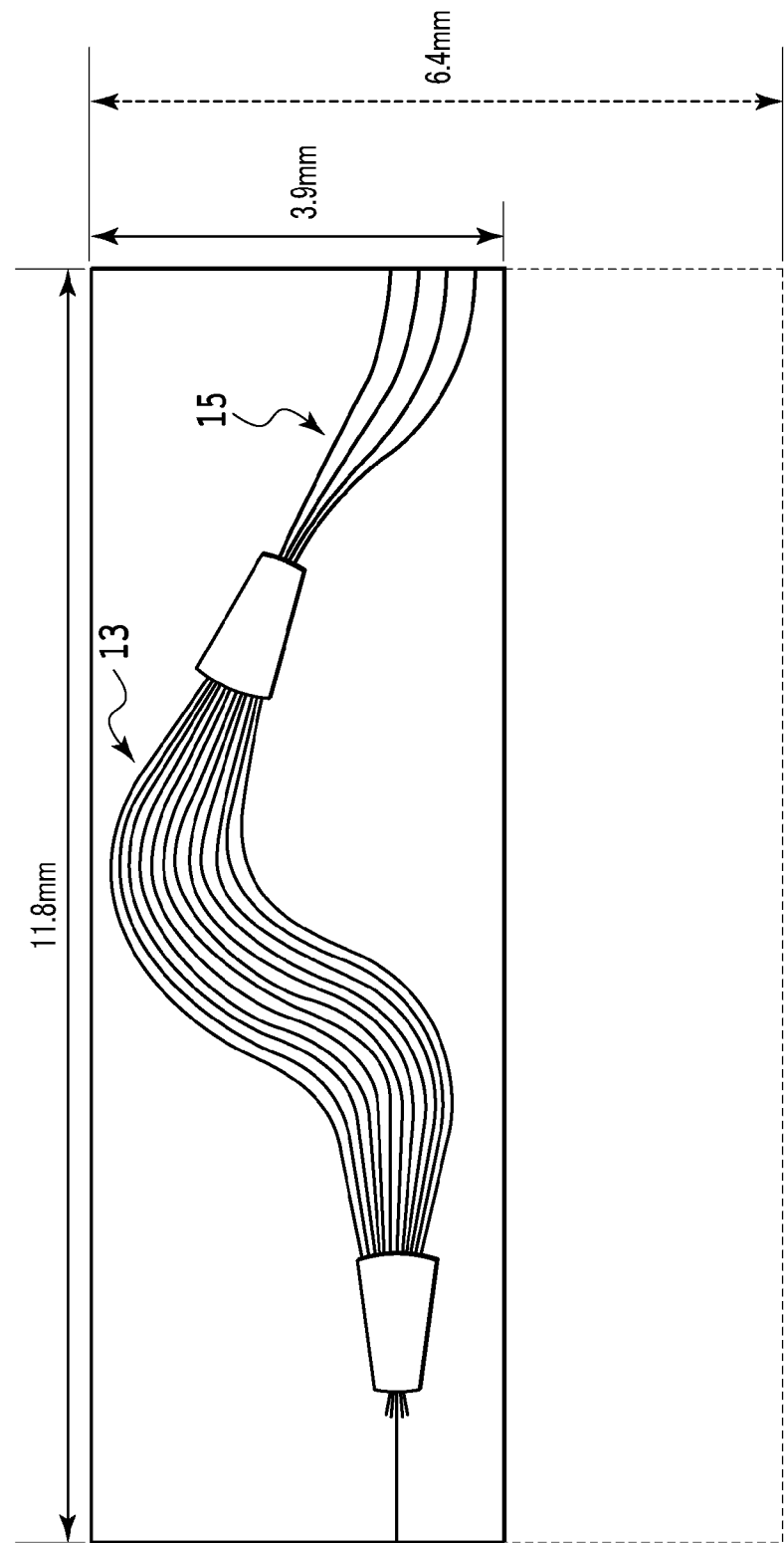
FIG. 6 is a waveguide arrangement diagram of an arrayed waveguide grating optical filter for CWDM signal four-channel demultiplexing designed in the second conventional example.

FIG. 6 illustrates a result of calculating the layout of an arrayed waveguide grating optical multiplexer/demultiplexer having the same wavelength arrangement and the same wavelength structure according to the design method of the second conventional example for comparison. An arrayed waveguide group 13 of the arrayed waveguide grating optical multiplexer/demultiplexer illustrated in FIG. 6 includes parallel-arranged S-shaped optical waveguides, and as a whole, has substantially point symmetric structure. The size of a completed chip was 11.8 mm long by 3.9 mm wide. The chip width of 3.9 mm is narrower than that of the arrayed waveguide grating optical multiplexer/demultiplexer illustrated in FIG. 5. However, in the case of adding a restriction that arranges the positions of output waveguides 15 at the side of the chip in the center, the chip width requires 6.4 mm. That is, the chip width is made larger than that of the arrayed waveguide grating optical multiplexer/demultiplexer according to the design method of the present invention. Also, the chip length of 11.8 mm was 3.6 mm longer, i.e., approximately 44% longer in ratio than that of the arrayed waveguide grating optical multiplexer/demultiplexer illustrated in FIG. 5 according to the design method of the present invention.

Figure 7:
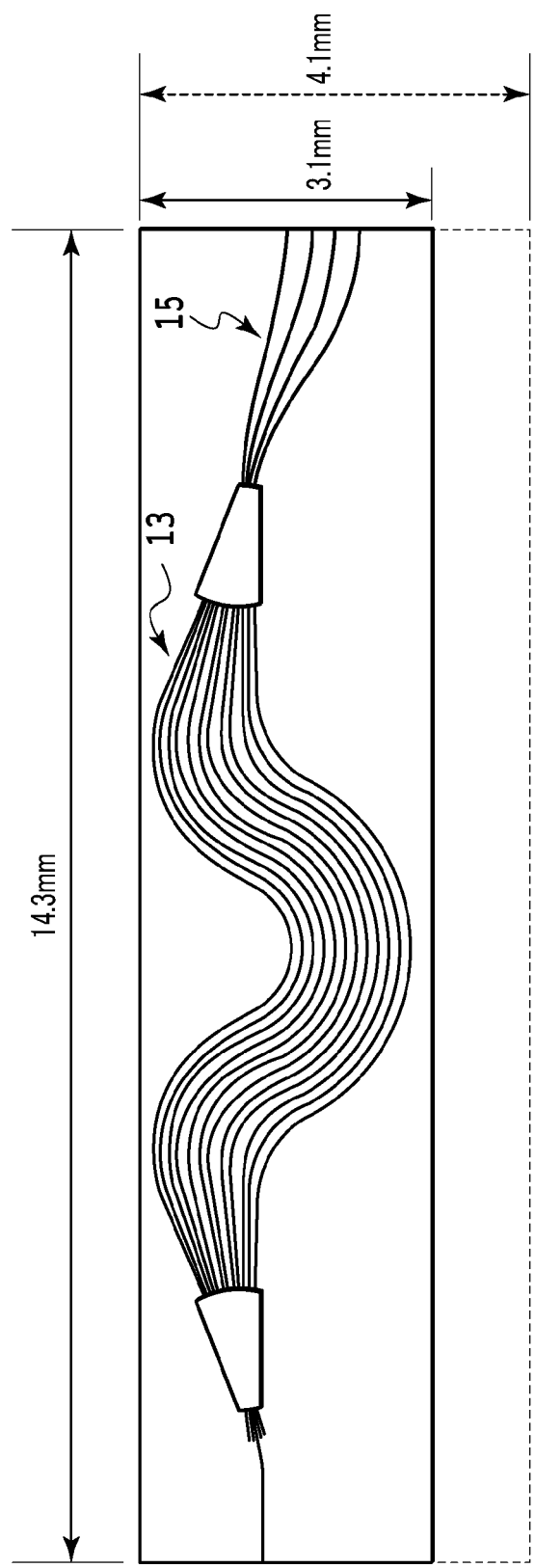
FIG. 7 is a waveguide arrangement diagram of an arrayed waveguide grating optical filter for CWDM signal four-channel demultiplexing designed in the third conventional example.

Further, FIG. 7 illustrates a result of calculating the layout of an arrayed waveguide grating optical multiplexer/demultiplexer having the same wavelength arrangement and the same wavelength structure according to the design method of the third conventional example for comparison. An arrayed waveguide group 13 of the arrayed waveguide grating optical multiplexer/demultiplexer illustrated in FIG. 7 has substantially line symmetric structure as a whole. Between the central part and both side parts of the arrayed waveguide group 13, protruding directions of an arc of an arcuate waveguide are opposite to each other. The size of a completed chip was 14.3 mm long by 3.1 mm wide. Even in the case of adding the restriction that arranges the positions of output waveguides 15 at the side of the chip in the center, the chip width was able to be formed as narrowly as 4.1 mm. However, the chip length of 14.3 mm was 6.1 mm longer, i.e., approximately 75% longer in ratio than that of the arrayed waveguide grating optical multiplexer/demultiplexer illustrated in FIG. 5 according to the design method of the present invention.

The arrayed waveguide grating optical multiplexer/demultiplexer illustrated in FIG. 5 according to the design method of the present invention, the arrayed waveguide grating optical multiplexer/demultiplexer illustrated in FIG. 6 according to the design method of the second conventional example, and the arrayed waveguide grating optical multiplexer illustrated in FIG. 7 according to the design method of the third conventional example respectively have chip areas of approximately 40 mm square, approximately 46 mm square, and approximately 44 mm square when removing the restriction that arranges the positions of output waveguides in the center of a chip. Accordingly, when estimating a unit chip cost from a yield per wafer, it turned out that by using the arrayed waveguide grating optical multiplexer/demultiplexer according to the design method of the present invention, the effect of reducing a unit chip cost by approximately 15% as compared with the optical multiplexer/demultiplexer of the first conventional example, and by approximately 10% as compared with the optical multiplexer/demultiplexer of the second conventional example was obtained.

In the arrayed waveguide grating optical multiplexer/demultiplexer in this example, the waveguides of the arrayed waveguide group change extending directions thereof 180 degree or more once, and then change the extending directions thereof in an opposite direction. Further, the first slab waveguide and the second slab waveguide are arranged on the inside between the rightmost end and leftmost end of the area where the arrayed waveguide group is arranged, and on the inside between the uppermost end and the lowermost end of the area where the arrayed waveguide group is arranged. As a result, a small chip size is achieved.

Further, in this example, the extending directions of the waveguides are changed 180 degrees or more, and the miniaturization is achieved with low loss. This is achieved by using the waveguides that are resistant to a steep bend as compared with a typical silica-based glass waveguide (a refractive index difference of 1% or less). In the case of the typical silica-based glass waveguide, a minimum bending radius with which the waveguide can be bent is 2 mm or more. When bending the typical silica-based glass waveguide further steeply, transmission light cannot fully bend, and is emitted outside the waveguide as radiation light. For this reason, when using the typical waveguide for a steep bend, a loss of an arrayed waveguide multiplexer/demultiplexer becomes large. However, when using a waveguide having a refractive index difference of 2% or more, a steeper bend with a minimum bending radius of 750 µm or less (in the 1300 nm wavelength band) can be achieved which is steeper than a bend of the typical waveguide.

In this example, by using the waveguides having the refractive index difference of 2% or more, a low loss arrayed waveguide multiplexer/demultiplexer is realized with the miniaturized configuration in which the extending directions of the waveguides are changed 180 degrees or more.

SECOND EXAMPLE

Figure 8:
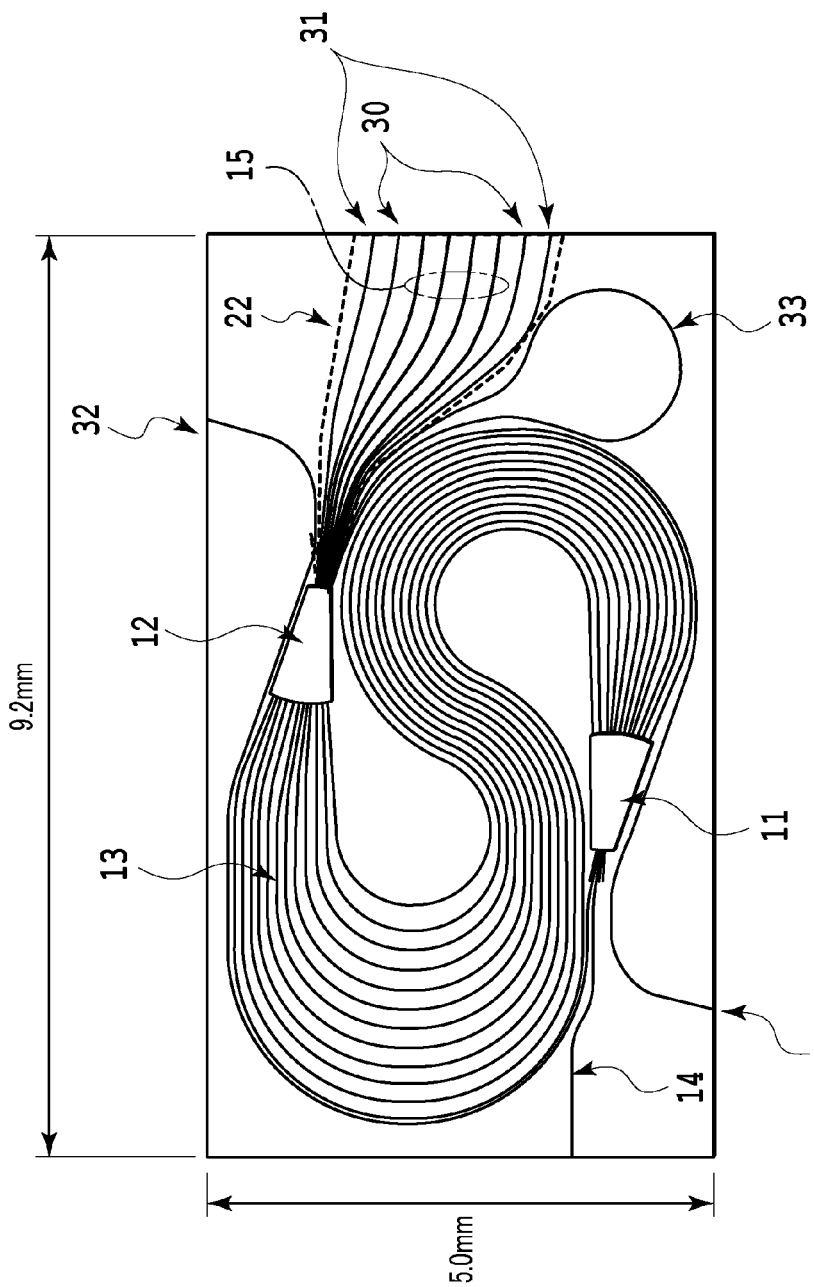
FIG. 8 is a waveguide arrangement diagram of an aligning waveguide-equipped arrayed waveguide grating optical filter for LAN-WDM signal demultiplexing designed in a second example.

In this example, in order to make the arrayed waveguide grading optical multiplexer/demultiplexer in the first example function as an aligning waveguide-equipped arrayed waveguide grating optical filter for LAN-WDM signal demultiplexing, the arrayed waveguide grating optical multiplexer/demultiplexer is configured such that wavelengths of optical signals to be demultiplexed are different. FIG. 8 is a waveguide arrangement diagram of the aligning waveguide-equipped arrayed waveguide grating optical filter for LAN-WDM signal demultiplexing designed in this example. Materials for waveguides and waveguide parameters used are the same as those of the arrayed waveguide grating optical multiplexer/demultiplexer illustrated in FIG. 5; however, wavelengths of optical signals to be demultiplexed are different. The wavelengths of the four waves were set to 1295.56 nm, 1300.05 nm, 1304.58 nm, and 1309.14 nm, and in consideration of a difference in transmission loss between channels, an FSR was set to 7830 GHz. As a result, a waveguide length difference given between any adjacent S-shaped arrayed waveguides was set to 25.79 µm. Also, as in the arrayed waveguide grating optical multiplexer/demultiplexer illustrated in FIG. 5, in order to exhibit flatness in a transmission range in multiplexing/demultiplexing characteristics, waveguide widths of an input waveguide 14 and output waveguides 15 were set to different values, respectively. Specifically, the width of the input waveguide 14 connected to a first slab waveguide 11 was set to 8.0 µm, and the width of the four output waveguides 15 connected to a second slab waveguide 12 was set to 15 µm.

Further, a minimum bending radius of the output waveguides having a width of 15 µm was set to 1200 µm, and a spacing between any adjacent ones of the output waveguides 15 at a chip side was set to 250 µm. In order to efficiently arrange a fan-out part 22 of the output waveguides 15, as in the arrayed waveguide grating optical multiplexer/demultiplexer illustrated in FIG. 5, a connecting point between the first slab waveguide 11 and the input waveguide 14 and a connecting point between the second slab waveguide 12 and the output waveguides 15 were arranged on the inside between the rightmost end and leftmost end of an area where the arrayed waveguide group 13 was arranged, and on the inside between the uppermost end and the lowermost end of an area where the arrayed waveguide group 13 was arranged.

The this example is configured to, on both sides of the output waveguides 15 as the four multimode waveguides illustrated in FIG. 8, additionally arrange a set of (two) first aligning light output waveguides 30 as single mode waveguides for aligning an optical lens array, and a set of (two) second aligning light output waveguides 31 as single mode waveguides for aligning a PD array. Further, the left and right sides of the chip of the arrayed waveguide grating optical multiplexer/demultiplexer were respectively connected with optical components, and therefore an aligning light input waveguide 32 was arranged on the upper side of the chip. Note that the aligning light input waveguide 32 is connected to the first slab waveguide 11 connected with the input waveguide 14 of the arrayed waveguide grating optical multiplexer/demultiplexer. On the other hand, the second slab waveguide 12 connected with the output waveguides 15 of the arrayed waveguide grating optical multiplexer/demultiplexer was connected with a looped waveguide 33 so as to make it possible for an optical signal inputted from the aligning light input waveguide 32 to turn back. Further, beside the looped waveguide 33, a third aligning light output waveguide 34 that gave an output to the lower side of the chip was placed.

Note that in order to make a return loss equal to or more than 40 dB, an angle formed between each of the output waveguides 15, set of (two) first aligning light output waveguides 30, and set of (two) aligning light output waveguides 31, which were placed on the right side of the chip, and the right side of the chip was set to eight degrees. Also, an angle of the aligning light input waveguide 32 with respect to the upper side of the chip, and an angle of the third aligning light output waveguide 34 with respect to the lower side of the chip were set to 8 degrees. The end surface of the left side of the chip was applied with AR (Anti-Reflection) coating for suppressing a reflected amount in the 1.3 band, and therefore an angle formed between the input waveguide 14 and the left side of the chip was set to a right angle.

As a result of the above design, when inputting lights in the 1.3 µm band from the aligning light input waveguide 32 on the upper side of the chip, light having a wavelength of 1324.2 nm is outputted from the third aligning light output waveguide 34 on the lower side of the chip; lights having wavelengths of 1287.8 nm and 1308.0 nm are outputted from the set of first aligning light output waveguides 30 for optical lens array alignment, respectively; lights having wavelengths of 1285.6 nm and 1310.28 nm are outputted from the set of second aligning light output waveguides 31 for PD array alignment, respectively; and light having a wavelength of 1319.5 nm is outputted to the input waveguide 14 of the arrayed waveguide grating optical filter for aligning and placing a receptacle member. The light is outputted to the input waveguide 14 through the following path. The light having a wavelength of 1319.5 nm among the lights entering the aligning light input waveguide 32 travels through the first slab waveguide 11 and second slab waveguide 12, then travels through the looped waveguide 33, again enters the second slab waveguide 12, and from the first slab waveguide 11, is outputted to the input waveguide 14.

FIGS. 9A, 9B, 9C, and 9D are schematic diagrams illustrating steps of assembling an optical lens array 36, a member for receptacle 37, and a PD array-integrated member 38 to the chip 35 of the aligning waveguide-equipped arrayed waveguide grating optical filter for LAN-WDM signal demultiplexing illustrated in FIG. 8.

Figure 9A:
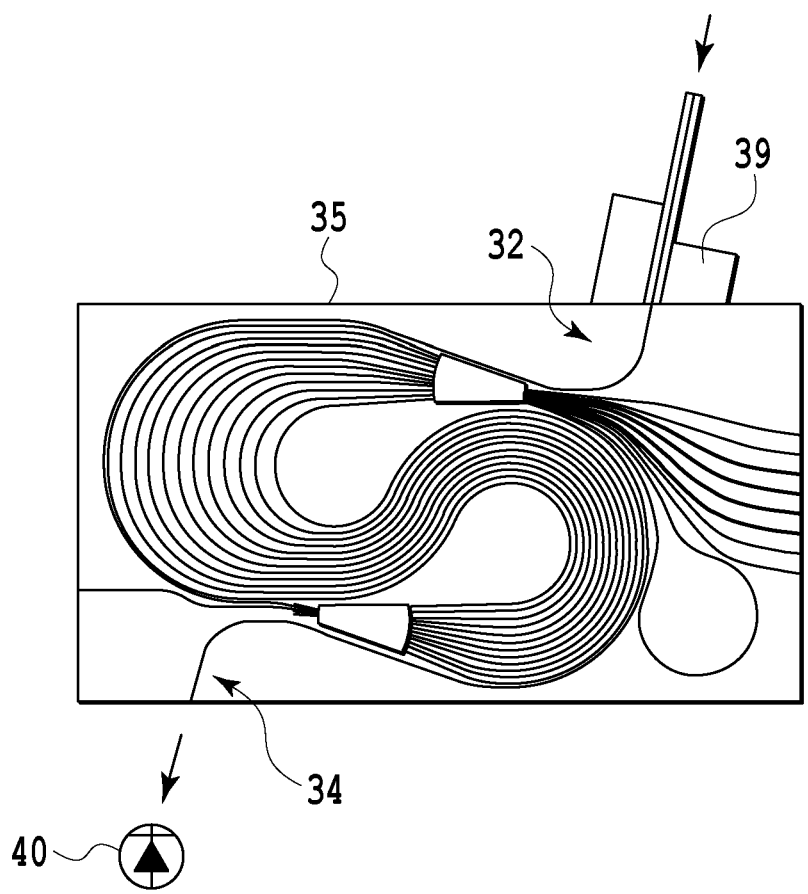
FIG. 9A is a diagram illustrating a first step of work to aligning an input side member (receptacle) and output side members (PD arrays and the like) with the aligning waveguide-equipped arrayed waveguide grating optical filter designed in the second example.

First, a single-core optical fiber block 39 is temporarily fixed to the aligning light input waveguide 32 on the chip upper side, not on the left or right side of the optical filter chip 35 to be assembled with the optical components, using the light having a wavelength of 1324.2 nm (FIG. 9A). More specifically, the exiting light from the third aligning light output waveguide 34 on the lower side of the optical filter chip 35 is received using a large diameter PD 40 to perform two-body alignment of the optical filter chip 35 and the single-core optical fiber block 39, and then temporary fixation is performed. Note that the temporary fixation is performed using a low adhesive strength adhesive or adhesive condition so as to make it possible to remove the single-core optical fiber block 39 after the assembling steps. Also, the end surface of the single-core optical fiber block 39 used here is polished at eight degrees, and therefore optical coupling can be performed with a loss and reflection at the chip upper side being suppressed small.

Figure 9B:
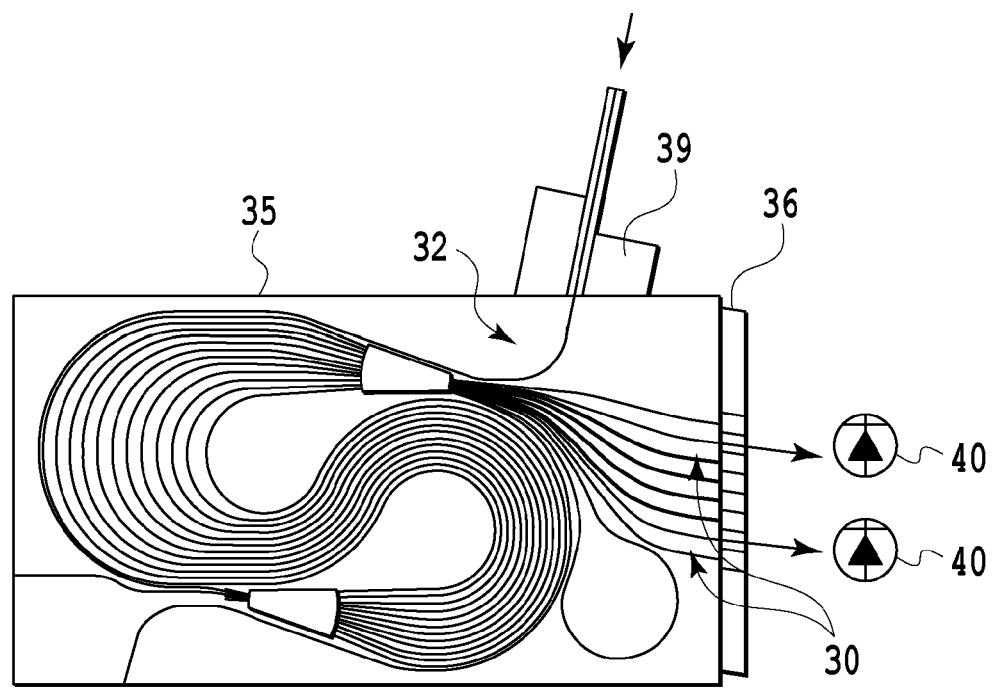
FIG. 9B is a diagram illustrating a second step of the work to aligning the input side member (receptacle) and the output side members (PD arrays and the like) with the aligning waveguide-equipped arrayed waveguide grating optical filter designed in the second example.

Then, when inputting the lights respectively having wavelengths of 1287.8 nm and 1308.0 nm to the aligning light input waveguide 32 on the chip upper side through the temporarily fixed single-core optical fiber block 39, the lights are outputted from the first aligning light output waveguides 30. The outputted lights are used to align the optical lens array 36 with a two-body aligner, and after completion of the alignment, the optical lens array 36 is fixed with an adhesive (FIG. 9B).

Figure 9C:
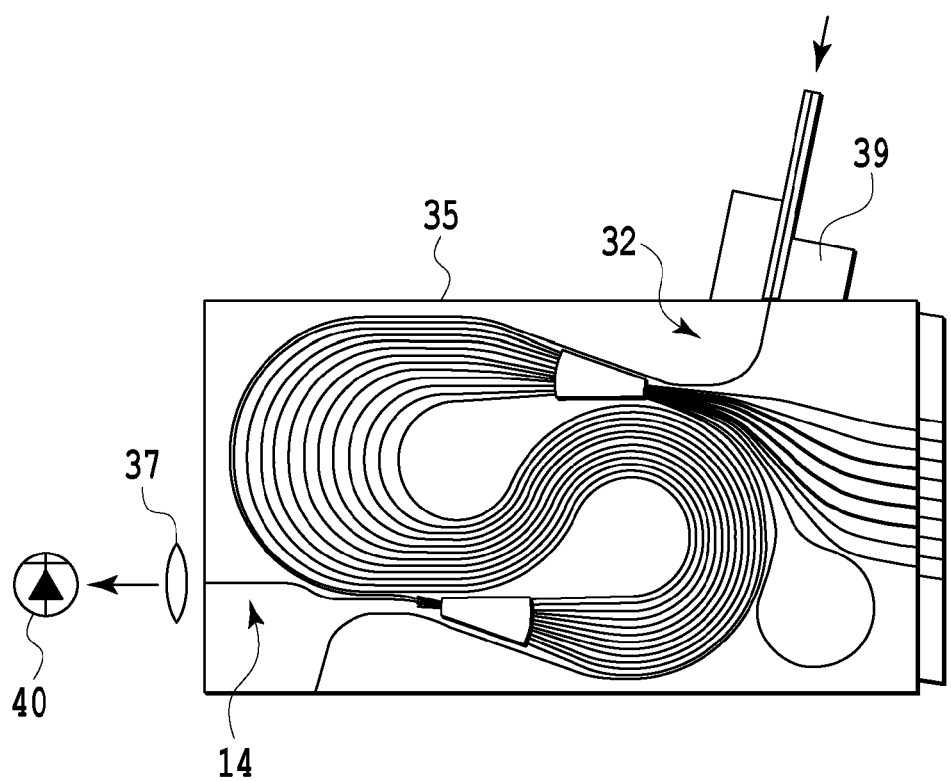
FIG. 9C is a diagram illustrating a third step of the work to aligning the input side member (receptacle) and the output side members (PD arrays and the like) with the aligning waveguide-equipped arrayed waveguide grating optical filter designed in the second example.

As a third step, when inputting the light having a wavelength of 1319.5 nm to the aligning input waveguide 32 on the chip upper side through the temporarily fixed single-core optical fiber block 39, the light is outputted from the input waveguide 14 of the arrayed waveguide grating optical filter. The outputted light is used to align the receptacle member 37 with the two-body aligner, and after completion of the alignment, the member for receptacle 37 is fixed with an adhesive (FIG. 9C).

Figure 9D:
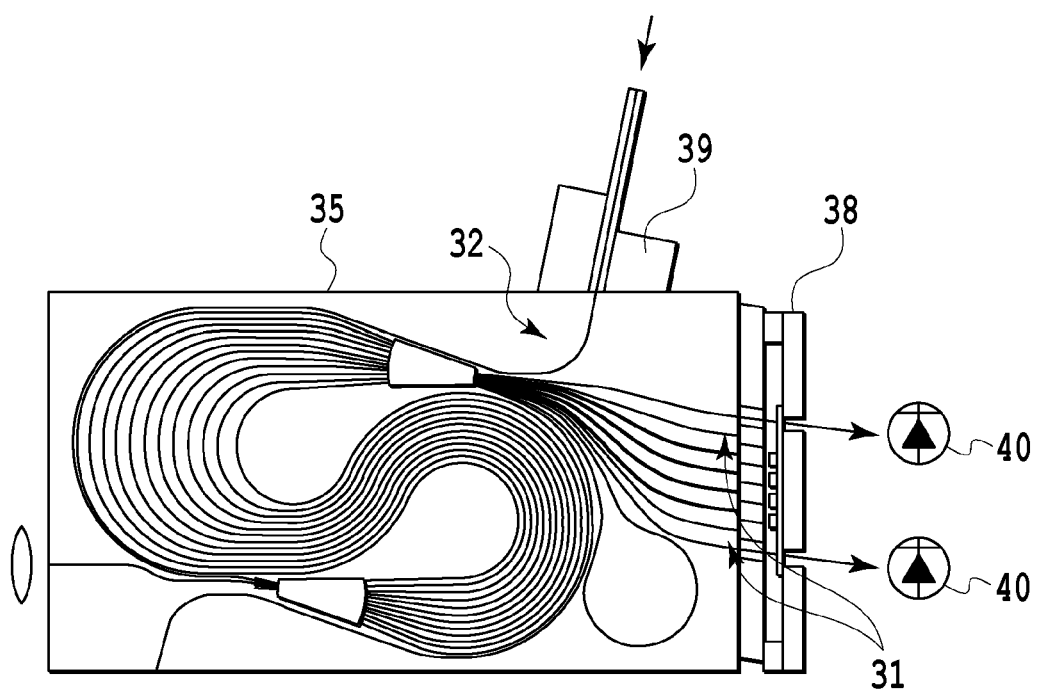
FIG. 9D is a diagram illustrating a fourth step of the work to aligning the input side member (receptacle) and the output side members (PD arrays and the like) with the aligning waveguide-equipped arrayed waveguide grating optical filter designed in the second example.

As a fourth step, when inputting the lights respectively having wavelengths of 1285.6 nm and 1310.28 nm to the aligning light input waveguide 32 on the chip upper side through the temporarily fixed single-core optical fiber block 39, the lights are outputted from the second aligning light output waveguides 31. The outputted lights are used to align the PD array-integrated member 38 with the two-body aligner, and after completion of the alignment, the PD array-integrated member 38 is fixed with an adhesive (FIG. 9D).

Finally, by applying torsional stress to remove the temporarily fixed single-core optical fiber block 39 from the optical filter chip 35, the assembling around the optical filter chip 35 is ended.

The important thing here is that the assembling of the peripheral members to the arrayed waveguide grating optical multiplexer/demultiplexer of the present invention described using FIGS. 9A, 9B, 9C, and 9D can be performed using only the two-body aligner without using an expensive multi-body aligner at all, which is complicated in usage and for three bodies or more. That is, using the arrayed waveguide grating optical multiplexer/demultiplexer of the present invention makes it possible to significantly suppress initial investment in an assembling line. As a result, a low-cost ROSA can be provided.

That is, since the lights from the aligning light input waveguide on the third chip side different from the sides for input and output is connected to the first slab waveguide, and the second slab waveguide is connected with the looped waveguide, the aligning lights can be outputted to both of the input and output waveguides. As a result, there is the advantage of being able to suppress a working cost at the time of assembling the peripheral members.

Also, in the assembling steps described using FIGS. 9A, 9B, 9C and 9D, as the optical lens array 36, a component formed by arraying and fixing eight GRIN (Gradient Index) lenses, and then polishing the end surfaces at eight degrees was used. Of the both end surfaces of the optical lens array 36, the end surface on the PD array side was applied with AR (Anti Reflection) coating, but the end surface on the optical filter chip 35 side was only polished with AR coating omitted. Further, the end surface of the arrayed waveguide grating optical multiplexer/demultiplexer of the present invention illustrated in FIGS. 9A, 9B, 9C, and 9D, which was assembled with the optical lens array 36, was only polished with AR coating omitted. In addition, for the adhesion between the optical filter chip 35 and the optical lens array 36, an adhesive of which a refractive index after cure was substantially coincident with that of quartz glass was used.

Further, the chip upper side where the end part of the aligning light input waveguide 32 used for the alignment was present, and the chip lower side where the end part of the aligning light output waveguide 34 was present were also only polished with AR coating omitted.

As a result of actually measuring a return loss from the boundary between the optical filter chip 35 and optical lens array 36 assembled together as described, the return loss was 40 dB or more. That is, by using the arrayed waveguide grating optical multiplexer/demultiplexer of the present invention, the application of AR coating that increases the number of processing steps to cause an increase in cost can be omitted up to four times. As a result, a lower-cost ROSA can be provided.

Needless to say, the same effect as the above-described effect can also be obtained between the optical filter chip 35 and the receptacle member 38. In this case, the application of AR coating can be omitted up to six timed, and a far lower cost ROSA can be provided.

Figure 10:
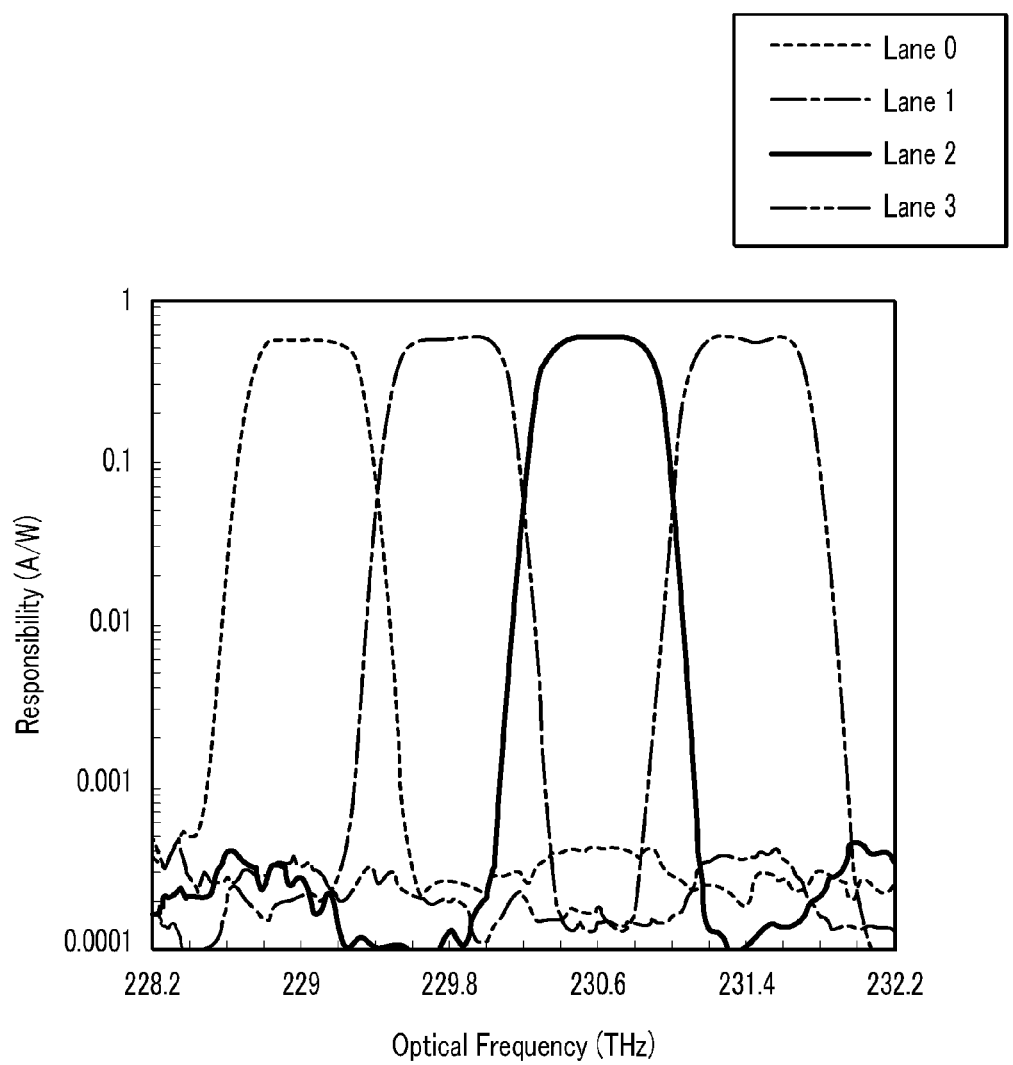
FIG. 10 is a graph illustrating the wavelength dependency of conversion efficiency of a ROSA module prepared in the second example.

FIG. 10 is a diagram illustrating wavelength dependent light receiving sensitivity of a ROSA module in which the aligning waveguide-equipped arrayed waveguide grating optical filter for LAN-WDM demultiplexing described using FIG. 8 is assembled with the receptacle member 37, optical lens array 36, and PD array-integrated member 38 by the assembling method described using FIGS. 9A, 9B, 9C, and 9D. Although the size of the optical filter chip 35 is 8.2 mm long by 4.9 mm wide, which is small, it turns out that sufficient demultiplexing characteristics are achieved.

Any of the above embodiments is described, taking the optical multiplexer/demultiplexer used as a ROSA as an example; however, without limitation to this, the above-described optical multiplexer/demultiplexer can also be used as a TOSA from the perspective of optical symmetry.

REFERENCE SIGNS LIST

1 First slab waveguide
2 Second slab waveguide
3 Arrayed waveguide group
3a, 3b, 3c Linear waveguides
3c, 3d Arcuate waveguides
4 Input waveguide
5 Output waveguides
6 Sectorial arcuate waveguide group
11 First slab waveguide
12 Second slab waveguide
13 Arrayed waveguide group
13a, 13d, 13h, 13k Linear waveguides
13b, 13c, 3e, 13f, 13g, 13i, 13j Arcuate waveguides
14 Input waveguide
15 Output waveguides
17 Waveguide length difference adjusting linear waveguide group
17a First waveguide length difference adjusting linear waveguide
17b Second waveguide length difference adjusting linear waveguide
18a First reference line
18b Second reference line
18c Third reference line
18d Fourth reference line
18e Fifth reference line
18f Sixth reference line
19a First reference point
19b Second reference point
20a Spread angle of linear waveguides 13a around first reference point 19a
21a Spread angle of linear waveguides 13b around second reference point 19b
22 Fan-out part of the output waveguides
30 First aligning light output waveguides
31 Second aligning light output waveguides
32 Aligning light input waveguide
33 Looped waveguide
34 Third aligning light output waveguide
35 Optical filter chip
36 Optical lens array
37 Member for receptacle
38 PD array-integrated member
39 Single-core optical fiber block
40 Large diameter PD

The invention claimed is:

1. An optical multiplexer/demultiplexer comprising:
at least one input waveguide that has an input part at one end;
a first slab waveguide of which one end is connected to the other end of the input waveguide;
an arrayed waveguide group of which one end is connected to the other end of the first slab waveguide, the arrayed waveguide group having a plurality of waveguides;
a second slab waveguide of which one end is connected to the other end of the arrayed waveguide group; and
at least one output waveguide of which one ends are connected to the other end of the second slab waveguide and the other ends respectively have output parts, wherein
each of the waveguides of the arrayed waveguide group is configured as an S-shaped waveguide having: a first bent part of which one end is connected to the first slab waveguide, and a waveguide extending direction changes 180 degrees or more; and a second bent part of which one end is connected to the other end of the first bent part, the other end is connected to the second slab waveguide, and a waveguide extending direction changes 180 degrees or more in a direction opposite to a direction of the change of the first bent part.

2. The optical multiplexer/demultiplexer according to claim 1, the optical multiplexer/demultiplexer being formed in a rectangular flat plate-shaped chip, wherein:
the input part of the input waveguide and the output parts of the output waveguide are respectively provided on opposite chip sides of the chip;
a connecting point between the input waveguide and the first slab waveguide is arranged so as to make a distance from the chip side where the input part is provided to the first slab waveguide larger than a distance from the chip side where the input part is provided to the arrayed waveguide group; and a connecting point between the second slab waveguide and the output waveguide is arranged so as to make a distance from the chip side where the output parts are provided to the second slab waveguide larger than a distance from the chip side where the output parts are provided to the arrayed waveguide group.

3. The optical multiplexer/demultiplexer according to claim 1, wherein:
the input part of the input waveguide and the output parts of the output waveguides are respectively provided at opposite end parts of the optical multiplexer/demultiplexer,
the optical multiplexer/demultiplexer further comprising an aligning light input waveguide of which one end is connected to the one end of the first slab waveguide, and the other end has an input part, wherein
the input part of the aligning light input waveguide is provided in a same plane as the input part of the input waveguide and the output parts of the output waveguides, and the input part of the aligning light input waveguide is provided at an end part of the optical multiplexer/demultiplexer, the end part being different from the opposite end parts, and
the other ends of two of the output waveguides are mutually connected to thereby form into a loop.

4. The optical multiplexer/demultiplexer according to claim 1, the optical multiplexer/demultiplexer being formed in a rectangular flat plate-shaped chip, wherein:
at least one of the input part of the input waveguide and the output parts of the output waveguide tilts at eight degrees or more from a perpendicular direction to a corresponding chip side.

5. The optical multiplexer/demultiplexer according to claim 2, the optical multiplexer/demultiplexer being formed in a rectangular flat plate-shaped chip, wherein:
at least one of the input part of the input waveguide and the output parts of the output waveguide tilts at eight degrees or more from a perpendicular direction to a corresponding chip side.

6. The optical multiplexer/demultiplexer according to claim 3, the optical multiplexer/demultiplexer being formed in a rectangular flat plate-shaped chip, wherein:

at least one of the input part of the input waveguide and the output parts of the output waveguides and the aligning light input waveguide tilts at eight degrees or more from a perpendicular direction to a corresponding chip side.

* * * * *